(12) United States Patent
Escriva

(10) Patent No.: US 10,282,307 B1
(45) Date of Patent: May 7, 2019

(54) LOCK-FREE SHARED HASH MAP

(71) Applicant: Dropbox, Inc., San Francisco, CA (US)

(72) Inventor: Robert Escriva, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/852,263

(22) Filed: Dec. 22, 2017

(51) Int. Cl.
*G06F 12/00* (2006.01)
*G06F 12/1018* (2016.01)
*G06F 13/16* (2006.01)
*G06F 9/52* (2006.01)
*G06F 16/22* (2019.01)
*G06F 16/23* (2019.01)

(52) U.S. Cl.
CPC .......... *G06F 12/1018* (2013.01); *G06F 9/52* (2013.01); *G06F 13/1663* (2013.01); *G06F 16/2255* (2019.01); *G06F 16/2365* (2019.01)

(58) Field of Classification Search
CPC ............. G06F 12/1018; G06F 16/2255; G06F 16/2365; G06F 9/52; G06F 13/1663
See application file for complete search history.

(56) References Cited

U.S. PATENT DOCUMENTS

2016/0110403 A1* 4/2016 Lomet ................. G06F 16/2329
707/695

\* cited by examiner

*Primary Examiner* — Shawn X Gu
(74) *Attorney, Agent, or Firm* — Hickman Palermo Becker Bingham LLP; Adam C. Stone

(57) ABSTRACT

Shared hash map implementations provide a linearizable programmatic interface to calling threads and support lock-free hash map operations. In addition to supporting lock-free operation, the shared hash map implementations are especially useful where the hash map is stored in a fixed-sized memory location such as, for example, in a shared memory segment, or in other situations where resizing the hash map is impractical or not desired.

28 Claims, 9 Drawing Sheets

LOCK-FREE SHARED HASH MAP

TECHNICAL OVERVIEW

The technology described herein relates to hash map data structures shared by concurrent threads of control.

INTRODUCTION

A hash map, which is sometimes referred to as a hash table, is a known data structure for mapping keys to values. A hash function is used to translate a key into a set of entries of the hash map, from which the desired value can be found.

Hash map implementations are widely used in computer software, particularly as associative arrays, indexes, caches, sets, dynamic programming language object representations, for string interning, transposition tables, etc.

Preferably, the hash function translates each key to a unique entry in the hash map. However, many hash map implementations tolerate collisions where the hash function translates different keys to the same entry. Different hash map implementations have different strategies for handling collisions.

One strategy for handling collisions is known as open addressing. With open addressing, a collision with a given entry is resolved by probing other entries in the hash map according to a probe sequence until the target entry is found or an empty entry is found. A common probe sequence is linear where the step per probe is fixed, typically at one entry.

An example operation of open addressing with linear probing is as follows. To search for a target key k in the hash map, entries of the hash map are probed, beginning with the entry at index i=h(k), where h is the hash function, and continuing to adjacent cells, for example, h(k)+1, h(k)+2, and so on, until encountering an empty entry or an entry with the target key k. If an entry with the target key k is encountered first, then the value v of that entry is returned as the result of the search. If an empty entry is found first, then the target key k is not in the hash map.

To insert a key-value pair (k, v) into the hash map, the same algorithm as searching is followed until the first empty entry or the first entry with key k is encountered and the key-value pair (k, v) is set in that entry.

Deleting a key k involves a complication in that setting the entry with key k to empty would affect the search algorithm such that the algorithm could incorrectly determine that other keys are not present in the hash map. Various known strategies such as lazy deletion or tombstoning or re-shuffling entries in the hash map may be employed to address this complication.

One challenge with open addressing hash map implementations is load factor. Load factor is the ratio of the number of non-empty entries in the hash map to the total number of entries (capacity) of the hash map. As the load factor grows toward one, the probability of a fixed-length probe sequence encountering an empty entry tends toward zero. A common drawback of a high load factor is increased number of collisions resulting in a slower hash map (e.g., searches increase from O(1) complexity toward O(N) complexity).

One basic strategy to avoid a high load factor is to expand the size of (resize) the hash map when the current load factor reaches a threshold. For example, the threshold might be 0.5 (e.g., half the entries in hash map are empty).

Another known technique for managing load factor is referred to as "Robin-Hood hashing". Generally, Robin-Hood hashing involves moving keys to different entries in the hash map to reduce the variance of average and maximum probe distance across all keys. In particular, with Robin-Hood hashing, if a new key would be placed relatively far away from its ideal location in the hash map as measured by probe distance, then another key that is relatively closer to its ideal location may be moved to make room for with the new key. Metaphorically, the "rich" keys are robbed of their relatively close probe distance to avoid making a new key "poor" in terms of its probe distance from its ideal location. By reducing the variance of average and maximum probe distances, the number of cache lines that must be fetched during probing is reduced, thereby allowing the hash map to be as performant at higher load factors than it would otherwise be without Robin-Hood hashing.

Another challenge with hash map implementations is handling concurrency. Concurrency exists where multiple threads of control share concurrent access to the hash map. The hash map may offer a programmatic interface (API) callable by threads for performing fundamental hash map operations such as get, put, delete, etc. A basic correctness condition for a concurrent hash map is that its programmatic interface be linearizable. To be linearizable, an operation on the hash map appear from the perspective of calling threads to take effect atomically between its invocation and its completion, and the calling threads perceive a total order of all their hash map operations. By providing a linearizable interface, it is easier for human computer programmers to reason about concurrency with respect to hash map operations. The concept of linearizability was defined by Maurice Peter Herlihy and Jeannette Marie Wing in their 1987 paper "Linearizability: A Correctness Condition for Concurrent Objects," the entire contents of which are hereby incorporated by reference.

One way to provide a linearizable interface for a hash map is using critical sections where only one thread at a time is permitted to operate on the hash map. Critical sections are often enforced using software synchronization primitives such as semaphores, mutexes, and locks. However, critical sections are not well-suited for large-scale, highly-concurrent, asynchronous, fault-tolerant systems. In particular, if a thread fails, halts, or delays in a critical section, then other threads are unable to progress. This lack of ability of other threads to make progress is sometimes referred to as deadlock.

So-called "lock-free" implementations exist that provide thread-safe access to a shared hash map without the use of software mutual exclusion primitives (e.g., locks). A concurrent object implementation is considered lock-free if it guarantees that some thread will complete an operation in a finite number of steps. The concept of a lock-free concurrent object implementation is described in a 1993 paper by Maurice Herlihy, called "A methodology for implementing Highly Concurrent Data Objects," the entire contents of which are hereby incorporated by reference.

For example, there exists a Java programming language-based lock-free shared hash map implementation that provides a high-performance lock-free shared hash map. However, the implementation resizes the hash map by copying entries in memory, which may not be practical or desired in certain circumstances. In particular, where a hash map is stored in a shared, fixed-sized memory block such as, for example, in a shared memory segment, or where memory resources are otherwise constrained such as, for example, in embedded devices, then resizing the hash map may not be practical or desired.

What is needed, then, is a lock-free shared hash map implementation that does not require resizing the hash map.

SUMMARY

The appended claims provide a useful summary of some embodiments of the present invention.

DRAWINGS

Features and advantages of the present invention will be better and more completely understood by referring to the following detailed description of example non-limiting illustrative embodiments in conjunction with the drawing of which:

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Overview

In some embodiments, a shared hash map provides a linearizable programmatic interface to calling threads for hash map operations in a lock-free manner. As will be described in greater detail below, resizing the hash map is not required for lock-free operation. Although not limited as such, the shared hash map is useful where the hash map is stored in a fixed-sized memory location such as, for example, in a shared memory segment, or in other situations where resizing the hash map is impractical or not desired.

System Overview

Figure 1:
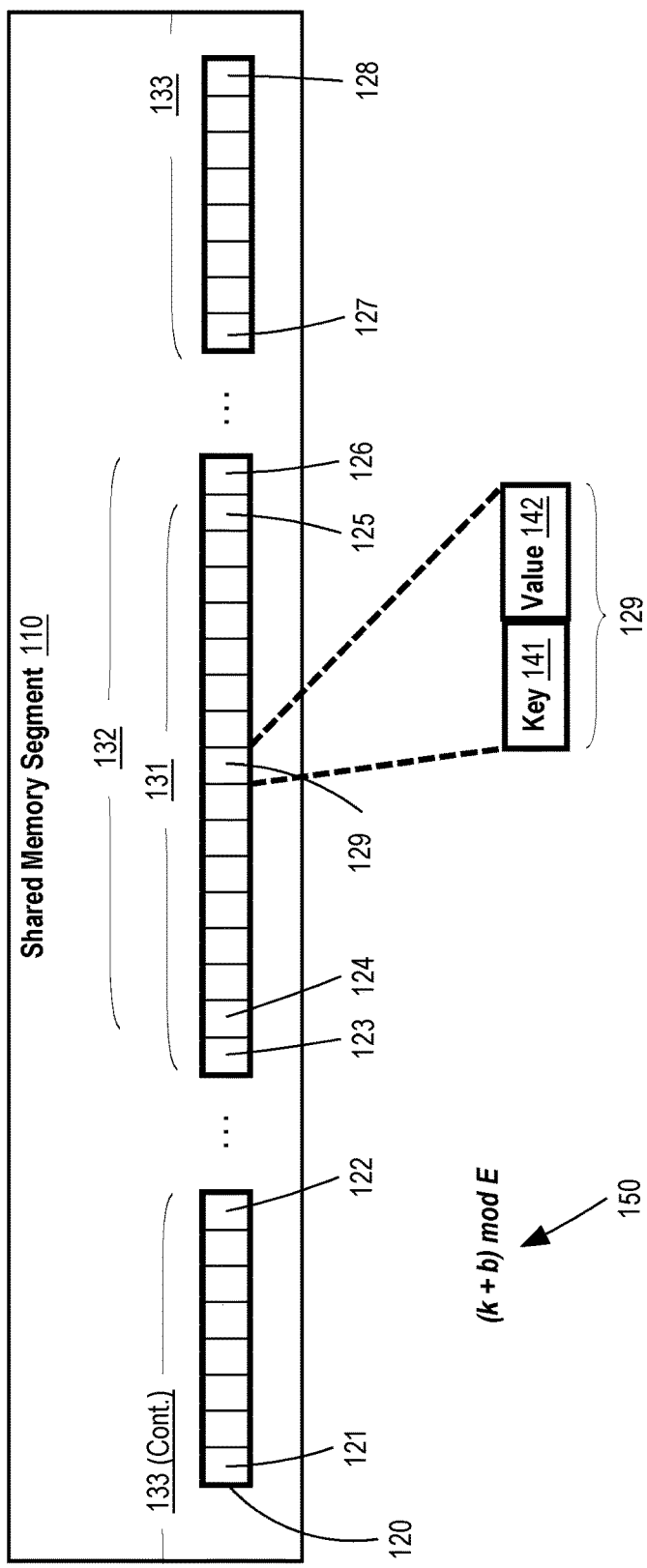
FIG. 1 shows a shared memory segment that stores an array of entries for implementing a shared hash map in a lock-free manner, according to some embodiments.

FIG. 1 shows a shared memory segment 110 that stores an array 120 of entries for implementing the shared hash map in a lock-free manner, according to some embodiments. The shared memory segment 110 may be allocated in main memory (e.g., RAM) of a computer system. For example, shared memory segment 110 may be allocated in main memory of a computer system such as that described below with respect to FIG. 7.

The shared memory segment 110 may be allocated by an operating system that controls the operation of the computer system. For example, shared memory segment 110 may be allocated because of a shared memory get (e.g., shmget( )) call or the like to the operating system. In some embodiments, shared memory segment 110 is a POSIX shared memory segment. POSIX stands for Portable Operating System Interface (POSIX) and refers to a family of standards specified by the Institute of Electrical and Electronics Engineers (IEEE) Computer Society for maintaining compatibility between operating systems.

While in some embodiments shared memory segment 110 is allocated in a portion of volatile memory (e.g., DRAM, SRAM, etc.), shared memory segment 110 is allocated in a portion of non-volatile memory (e.g., flash memory, solid-state storage, etc.) in other embodiments. Thus, there is no requirement that the shared hash map be implemented only with volatile memory hardware devices.

The shared hash map may be viewed as a combination of the array 120 stored in the shared memory segment 110, a hash function h (e.g., hash function 150), and an implementation of a programmatic interface (API) concurrently callable by multiple threads of control. The shared hash map supports concurrent read and write access by multiple threads of control. For example, the multiple threads may each be executing on a computer system, each have the shared memory segment 110 open, and each concurrently reading and writing to the shared hash map via the programmatic interface in a lock-free manner.

As used herein, the terms "thread" and "thread of control" is used broadly to refer a sequence of programmed instructions that can be managed independently by an operating system scheduler, either at the kernel-level or at the user-level. For example, a "thread" or "thread of control" as used herein can be an operating system process, kernel thread, user thread, or fiber.

In some embodiments, the shared hash map implementation is "lock-free" which refers to a guarantee met by the shared hash map that at least one thread will complete an operation on the shared hash map in a finite number of executed instructions. The guarantee is more than just the lack of use of software synchronization primitives, such as locks. The guarantee means that a thread operating on the shared hash map may be pre-empted, may fail, or may stop running and such pre-emption, failure, or stoppage will not prevent all other threads from completing an operation on the shared hash map in a finite number of executed instructions.

By being lock-free, the shared hash map provides highly concurrent operation. The level-of-concurrency that may be realized with the shared hash map is potentially orders of magnitude more than could be achieved with a lock-based shared hash map that uses a reader/writer mutex to synchronize access by multiple threads. For example, under highly concurrent operation involving multiple threads concurrently updating the shared hash map with many keys, it may be possible to reach the bandwidth limits of the hardware memory bus.

Because the shared hash map is lock-free, it is useful as a large-scale look-aside cache. For instance, in the context of a highly concurrent, large-scale online service used by millions of users or more, the lock-free shared hash map may be used to store associations between user identifiers and a time the user last accessed the online service. This is just one example of a useful application of the lock-free shared hash map. Other useful applications are possible and the lock-free shared hash map is not limited to any particular application.

In addition to operating in a lock-free manner, the shared hash map provides a linearizable programmatic interface callable by multiple concurrent threads. In some embodiments, the programmatic interface includes the operations of: Get, Put, PutIfNotExist, Del, DelIf, and CAS (i.e., compare and swap). The programmatic interface will now be described briefly with reference to examples provided in the Go programming language. Implementations of the programmatic interface, however, are not limited to the Go programming language or any particular programming language.

func Get (k uint64, v* uint64) bool

The Get( ) operation searches the shared hash map for the value of a specified key k. If the key k is stored in the shared hash map, then the operation stores the value of the key k in the specified memory location pointed to by v* and returns true from the operation. Otherwise, if the key k is not stored in the shared hash map, then the operation returns false.

func Put (k uint64, v uint64) bool

The Put( ) operation inserts the specified key k with the specified value v into the shared hash map. The operation returns true if the insertion is successful. The operation returns false if there no available storage space in the shared hash map for the insertion.

func PutIfNotExist (k uint64, v uint64) bool

The PutIfNotExist( ) operation inserts the specified key k with the specified value v into the shared hash map if the key k does not already exist in the shared hash map. The operation returns true if the insertion is successful. The operation returns false if the key k is already stored in the shared hash map or if there is no available storage space in the shared hash map for the insertion.

func Del (k uint64) bool

The Del( ) operation removes the specified key k from the shared hash map. The operation returns true if the key k is successfully removed. The operation returns false if the key k is not stored in the shared hash map.

func DelIf (k uint64, v uint64) bool

The DelIf( ) operation removes the specified key k from the shared hash map if the key k maps to the specified value v in the shared hash map. The operation returns true if the key k maps to the specified value v in the shared hash map and the key k is removed. The operation returns false if the key k is not stored in the shared hash map or if the key k does not map to the value v in the shared hash map.

func CAS (k uint64, e uint64, v uint64, w* uint64) bool

The CAS( ) operation performs an atomic compare and swap on the shared hash map. In particular, the operation atomically compares the current value stored in the shared hash map for the specified key k to the specified expected value e and sets the value for the key k in shared hash map to the specified target value v if and only if the current value for the key k in the shared hash map equals the expected value e. The CAS( ) operation returns true if the value for the key k in the shared hash map is updated to the target value v. The CAS( ) operations returns false if the current value does not equal the expected value e. The current value is copied into the given memory location pointed to by w* whether the operation succeeds or fails.

The array 120 has a number E of entries. The number E of entries can vary according to the requirements of the particular implementation at hand. For example, number E of entries can be as few as tens or hundreds of entries (or fewer) or as many as millions or billions of entries (or more).

To facilitate lock-free operation, each entry of the array 120 preferably has a fixed byte/bit-width equal to an allowable byte/bit-width of the operands of an atomic compare-and-swap processor instruction (referred hereinafter as "the atomic CAS instruction"). For example, with the x86 instruction set, the CMPXCHG family of instructions with the LOCK prefix may be used as the atomic CAS instruction. The CMPXCHG family of instructions include the CMPXCHG8B processor instruction that, with the LOCK prefix, operates atomically on 8-byte (64-bit) operands and the CMPXCHG16B processor instruction that, with the LOCK prefix, operates on 16-byte (128-bit) operands.

Preferably, the CAS instruction executes atomically from the perspective of a shared hash map implementation. For example, the CMPXCHG16B x86 processor instruction with the LOCK prefix can be used to atomically compare a 128-bit value stored in one or more registers with a specified target 16-byte aligned 128-bit entry of the array 120, and if the two values are equal, then set the 128-bit register value in the memory location of the target entry, or set the 128-bit value in the memory location of the target entry in the register(s), if the two values do not match.

Non-x86 instruction sets or future x86 instruction sets may support the same or different byte/bit-width operands. Thus, implementations of the shared hash map are not limited to the CMPXCHG family of instructions or any particular atomic CAS instruction, or limited to any particular fixed byte/bit width for entries of array 120.

It should be noted that the atomic CAS instruction is distinct from the CAS( ) operation discussed above and offered by the programmatic interface in some embodiments of the shared hash map. In particular, as described herein, the CAS( ) operation and other operations of the shared hash map that may be invoked via the programmatic interface of the shared hash map use in their implementation the atomic CAS instruction to provide a linearizable programmatic interface with lock-free operation.

In addition to the atomic CAS instruction, implementations of the shared hash map may use an atomic load processor instruction (hereinafter "the atomic load instruction") that is capable of copying a source operand to a destination operand. For example, the MOV instruction of the x86 instruction set can be used to atomically copy a specified entry of array 120 to a register. Other instructions may be used with another processor instruction set. For example, for the ARM instruction set, the LDREX instruction may be used as the atomic load instruction. In some embodiments, the shared hash map uses the atomic load instruction to atomically read an entry of array 120.

In some embodiments, each entry of the array 120 is logically divided into a fixed byte/bit-width key portion and a fixed byte/bit-width value portion. This is shown in FIG. 1 using entry 129 as a representative example. As shown, entry 129 has a logical key portion 141 and a logical value portion 142. The key portion 141 may correspond to the first X number of bytes/bits of the entry 129 and the value portion 142 may correspond to the last (next) Y number of bytes/bits of the entry 129, or vice versa. For example, X and Y may be equal. As such, if the fixed byte/bit-width of entry 129 is 16 bytes/128-bits, then the key portion 141 is 8 bytes/64-bits in size and the value portion 142 is also 8 bytes/64-bits in size.

In some embodiments, the data type of each key portion and the data type of each value portion of each entry in the array 120 is a 64-bit unsigned integer. For example, in some implementations, the data type of each entry of the array 120 is declared using the C-programming language as follows:
    struct entry {unit64_t k; unit64_t v;}

In some embodiments, to facilitate lock-free operation, the entries of the array 120 may be logically grouped into buckets. As used herein, a "bucket" may refer to a subset of a fixed number of entries of the array 120 in which a given key k may be stored in the shared hash map. This fixed number of entries may be referred to as the bucket size for the shared hash map.

In some embodiments, the bucket size is relatively small compared to the total number of entries in the array 120, to provide a high-performance shared hash map. For example, the bucket size may be between four and sixteen entries inclusive where the array 120 may contain millions of entries or more. Selecting a relatively small bucket size can improve performance of the shared hash map by limiting the number of processor cache lines that are searched when performing hash map operations on a bucket. Nonetheless, a bucket size between four and sixteen entries inclusive is not a requirement of implementations of the shared hash map and other bucket sizes may be used according to the requirements of the particular implementation at hand.

In some embodiments, the bucket size is the same for all buckets of the shared hash map. However, it is also possible for the bucket size to vary between buckets or groups of buckets of the shared hash map, so long as the bucket size of any given bucket can be determined.

In some embodiments, the hash function h of the shared hash map deterministically maps a given key k to a fixed number of entries that collectively are the bucket for that key k. In other words, given the array 120 and a key k, the bucket of entries in the array 120 for the given key k is deterministic. Multiple different keys may be mapped to the same bucket by the hash function h. For example, hash function 150 may be used to map a given key k to the $b^{th}$ entry of the given key k's bucket, where b is greater than or equal to zero but strictly less than the bucket size B of the bucket, and E is the total number of entries of the array 120. Hash function 150 may also map other given keys to k's bucket. Thus, a bucket of the shared hash map may store multiple different keys that are mapped to the bucket by the hash function h.

Hash function 150 is just one example of a possible hash function h for the shared hash map. In some embodiments, the hash function h forms a bucket of consecutive entries in array 120. For example, hash function 150 does this. For example, according to hash function 150, bucket 131 consists of consecutive entries 123 through 125 and bucket 132 consists of consecutive entries 124 through 126. It is also possible to use a hash function does not form a bucket of consecutive entries in the array 120. For example, a hash function that incorporates a quadratic function could form a bucket in which the number of entries in the array 120 between the $b^{th}$ and $b^{th}+1$ entry of the bucket increases linearly as b increases. As another example, a hash function may incorporate another hash function to form a bucket consisting of non-consecutive entries in array 120.

In some embodiments, buckets overlap in entries. For example, according to hash function 150, bucket 131 and bucket 132 overlap each other by entries 124 through 125. A bucket may also wrap-around the end of the array 120. For example, according to hash function 150, bucket 133 consists of entries 127 through 128 and entries 121 through 122.

While a given key k may be used directly in the hash function h to select an entry for the given key k as in the example hash function 150, a function other than an identity function may be applied to k within the hash function h to select an entry for a given key k according to the requirements of the particular implementation at hand. For example, instead of the hash function 150 the applies the identity function to the given key k, a hash function such as (ƒ(k)+b) modulo E may be used instead. Here, ƒ(k) represents the output of a function (other than the identity function) applied to k. Some non-limiting examples of possible functions f that may be used include a lookup3 hash function by Bob Jenkins, a Fowler-Noll-Vo (FNV) hash function, a CityHash fuction, a Murmur Hash Function, or other non-cryptographic hash function. More information on the lookup3 hash function is available on the Internet at /bob/c/lookup3.c in the burtleburtle.net domain, More information on the Fowler-Noll-Vo (FNV) hash function is available on the Internet at /wiki/Fowler-Noll-Vo_hash_function in the wikipedia.org domain, the entire contents of which is hereby incorporated by reference. More information on the CityHash function is available on the Internet at /2011/04/introducing-cityhash.html in the opensource.googleblog.com domain, the entire contents of which is hereby incorporated by reference. More information of the Murmur Hash Function is available on the Internet at /wiki/MurmurHash in the wikipedia.org domain, the entire contents of which is hereby incorporated by reference.

Hash Map States and State Transactions for Insert Operations

In some embodiments, to provide lock-free operation, implementations of the shared hash map allow entries to have only certain states and make only certain state transitions. To facilitate these states and state transitions, a reserved value (e.g., zero) is used for keys and values stored in the shared hash map.

Figure 2:
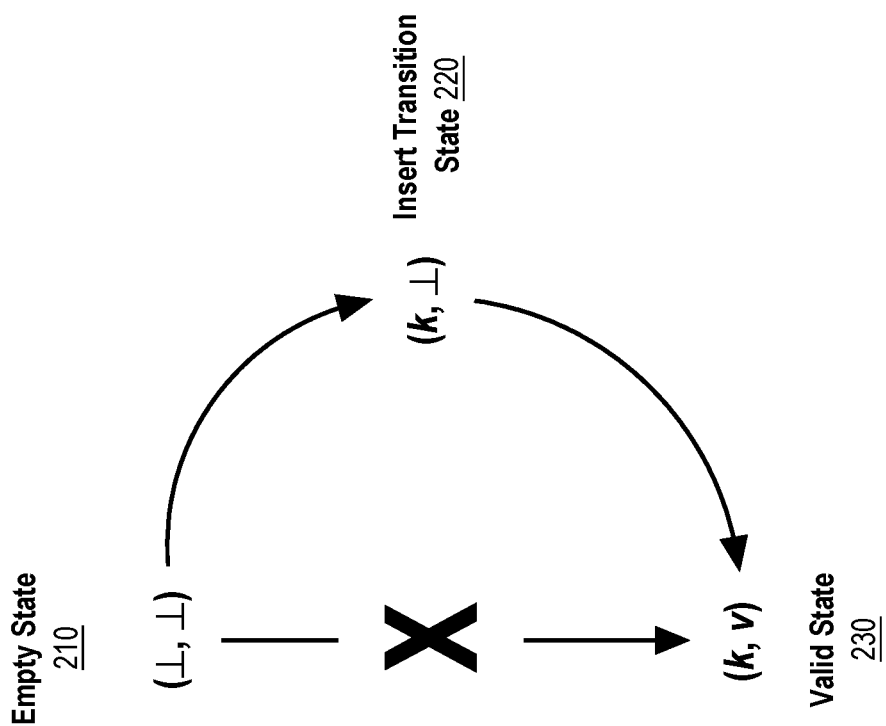
FIG. 2 shows valid states and state transitions for an entry in an array of entries for implementing a shared hash map in a lock-free manner such as that which is stored in the shared memory segment of FIG. 1, according to some embodiments.

FIG. 2 shows valid states and state transitions for an entry in the array of entries 120 for implementing the shared hash map in a lock-free manner, according to some embodiments. In this description and in the figures, the notation "(x, y)" is used to represent the value of the entry. In particular, the parameter x represents the value of the key portion 141 of the entry and the parameter y represents the value of the value portion 142 of the entry. The parameter x is either the reserved value in state 210 or a key kin states 220 and 230. The parameter y is either the reserved value in state 210 and state 220 or a value v of a key kin state 230.

While the reserved value is zero in some embodiments, the reserved value may be a different fixed value in other embodiments. For example, if the bit-width of key portion 141 and the value portion 142 of entries in the array 120 is 64-bits, then the reserved value might be $2^{64}-1$ (two to the power of 64 minus one). Because of the use of the reserved value to provide lock-free operation, there is a constraint on valid keys and valid values stored in shared hash map that they are not allowed to be equal to the reserved value. For example, if the reserved value is zero, then no entry of the array 120 in the valid state 230 can have a zero for the key or a zero for the value. In this description and the drawings, the "up tack" character '⊥' is sometimes used to represent the reserved value, which may or may not be zero.

In some embodiments, initially each entry of the array 120 is in the empty state 210 where both (x, y) are set to the reserved value. As discussed in greater detail below, an entry in the "empty" state 210 can transition to the "insert transition" state 220 when attempting to insert a given key-value pair (k, v) into the shared hash map. From that state, the entry can then transition to a "valid" state 230 provided the calling thread passes through a "scan barrier" on the given key's bucket for the given key k. This scan barrier is discussed in greater detail below. In the valid state 230, the entry stores a valid key-value pair (k, v) of the shared hash map. The entry may transition from the valid state 230 back to the empty state 210 when the key k is removed from the shared hash map. Notably, as described in greater detail below, to provide correct lock-free operation, an entry is not allowed to transition directly from the empty state 210 to the valid state 230 without transitioning through the insert transition state 220 when inserting a key k into the shared hash map.

In some embodiments, atomic transitions between states 210, 220, and 230 for an entry are undertaken (accomplished) by use of the atomic CAS instruction. For example, to atomically transition an entry from the empty state 210 to the insert transition state 220 for a given key k, the atomic CAS instruction may be invoked on the entry where the expected value is (⊥, ⊥) and the target value for the entry is (k, ⊥).

In some embodiments, the empty state 210 and the insert transition state 220 are each internal to implementations of the shared hash map and may be hidden from threads invoking operations on the shared hash map. As such, in some embodiments, the programmatic interface of the shared hash map may encapsulate states 210 and 220 within the implementations.

According to some embodiments, to provide correct lock-free operation, implementations of the shared hash map uphold two invariants. The first invariant is that, for any given key k, only a finite number of identifiable entries of the array 120 can store the given key k. The second invariant is that, for any given key k, at most one entry in the array 120 is in the valid state 230 for the given key k. These invariants are upheld in a lock-free manner, while providing a linearizable programmatic interface to the shared hash map, and while allowing multiple threads to concurrently perform read and write operations on the shared hash map.

With regard to the first invariant above, since the array 120 is not resized (either by adding or removing entries), the shared hash map guarantees the first invariant is upheld. In particular, given a key k, the hash function may be used to map to the given key's bucket. The entries of the bucket are the only entries in the array 120 in which the given key k may reside.

With regard to the second invariant, the shared hash map upholds the second invariant by limiting the allowable states and state transitions for entries in the array 120, by use of the atomic CAS instruction, and by use of a "scan barrier" on a per-bucket basis, according to some embodiments.

According to some embodiments, when inserting a given key k into the shared hash map in the context of a calling thread (e.g., a thread calling the Put( ) operation of the shared hash map programmatic interface), a "target" entry in the bucket for the given key k (the "target bucket") is not allowed to transition directly from the empty state 210 to the valid state 230, but instead must transition through the insert transition state 220. In addition, the transition from the insert transition state 220 to the valid state 230 is not undertaken unless the calling thread passes through the scan barrier on the target bucket.

In some embodiments, for the calling thread to pass through the scan barrier on the target bucket, at most one entry in the insert transition state 220 can exist in the target bucket for the given key k when the scan barrier is performed. If more than one entry for exists in the insert transition state 220 for the given key k when the scan barrier is performed, then the calling thread transitions one of these entries back from the insert transition state 220 to the empty state 210 and then attempts the insert operation. If the calling thread passes through the scan barrier, then the calling thread may safely transition the one entry in the insert transition state 220 for the given key k to the valid state 230. As discussed in greater detail herein, because the calling thread performs the scan barrier in this way, the second invariant and the linearizable guarantee of the shared hash map's programmatic interface are upheld by the shared hash map.

According to some embodiments, performing a scan barrier on a target bucket for a given key k involves atomically inspecting each entry of the target bucket one at a time and in order of the entries in the bucket to determine whether only one entry exists in the insert transition state 220 for the given key k, or whether more than one entry exists in the insert transition state 220 for the given key k. According some embodiments, the atomic inspection of an entry is accomplished by invoking the atomic load instruction on the entry. It is also possible to use the atomic CAS instruction if it provides a "witness" of the entry on failure. The witness is the value of entry "seen" by the atomic CAS instruction. For example, to atomically inspect the entry you might issue the atomic CAS instruction on the entry attempting to compare and swap the entry from and to the same value (e.g., from (k, x) to (k, x)). For example, x may be set equal to the reserved value. If successful, then the value of the entry is (k, x). If unsuccessful, then the value of the entry is the provided by the witness.

Insert Scan Barrier

Figure 3:
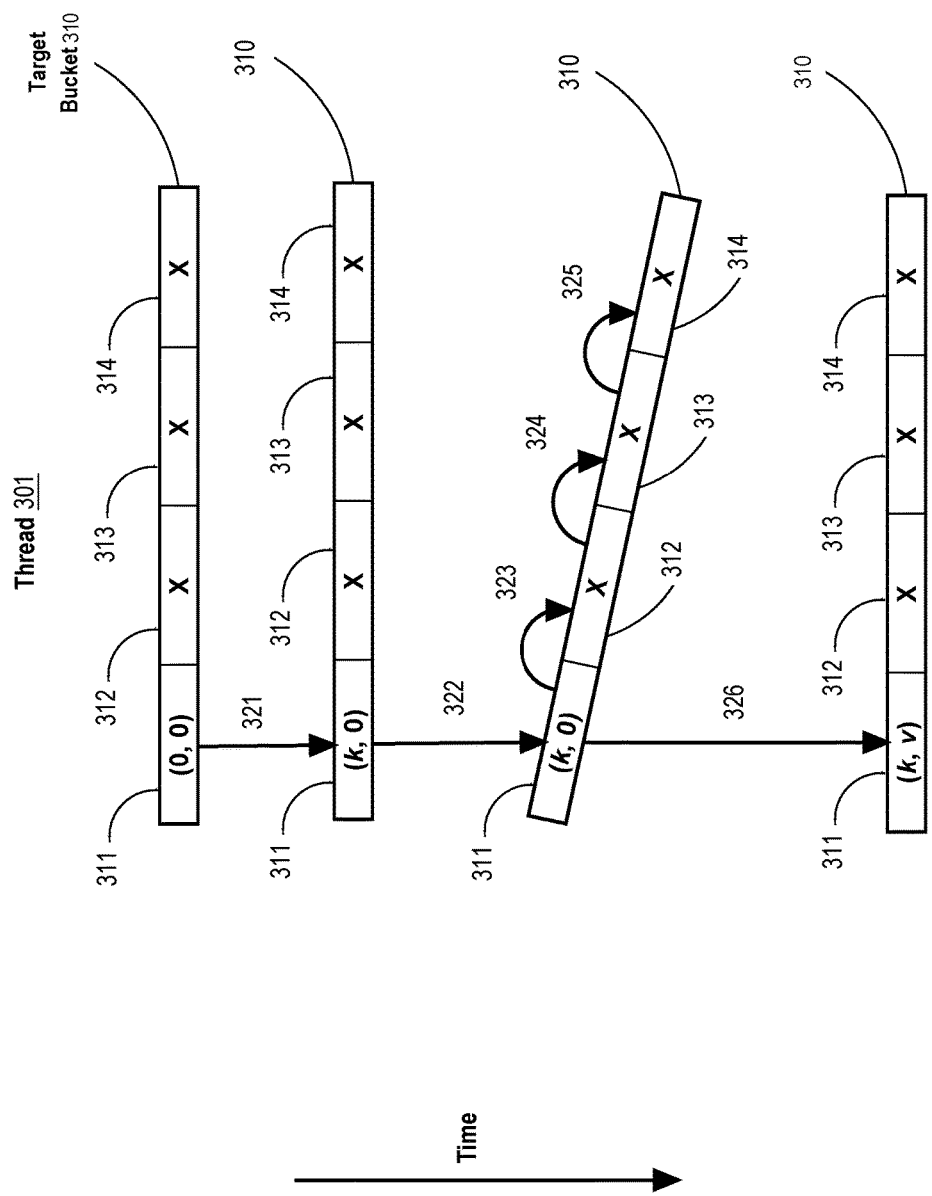
FIG. 3 shows how a performance of a scan barrier allows multiple threads to concurrently and correctly perform an insert operation on the shared hash map to insert the same key k in a lock-free manner, according to some embodiments.

FIG. 3 illustrates how performance of the scan barrier on the target bucket allows multiple threads to concurrently and correctly perform an insert operation on the shared hash map to insert the same key k in a lock-free manner while upholding the second invariant and the linearizable interface guarantee to the threads, according to some embodiments.

In some embodiments, the shared hash map uses open addressing with linear probing to find a suitable candidate entry key in key k's bucket into which to attempt to insert the key k. In some embodiments, a suitable candidate entry is, in order of preference, an entry in the valid state 230 for key k, an entry in the insert transition state 220 for the key k, or an entry in the empty state 210.

While some embodiments may use open addressing with linear probing to find a suitable candidate entry, other embodiments may use open addressing with quadratic probing or double hashing probing depending on how the hash function h groups entries into buckets. In the example depicted in FIG. 3, the target bucket 310 has a bucket size of four for purposes of providing clear examples.

In the scenario of FIG. 3, after the first thread 310 selects the first entry 311 as the candidate entry, the first thread 310 transitions 321 the first entry 311 from the empty state 210 to the insert transition state 220 for the given key k. Next, the first thread 310 performs the scan barrier on the target bucket 310 for the given key k. This involves atomically reading each entry of the target bucket 310 one at a time as represented by atomic load instruction executions 322, 323, 324, and 325. In particular, atomic load instruction execution 322 reads the first entry 311, then atomic load instruction execution 323 reads the second entry, then atomic load instruction execution 324 reads the third entry 313, and finally atomic load instruction execution 325 reads the fourth entry 314. Causally, it can be correctly said that 326 happened after 325 which happened after 324 which happened after 323 which happened after 322 which happened after 321.

Continuing the discussion of the scenario of FIG. 3, since the scan barrier identifies the first entry 311 as the only entry in the insert transition state 220 for the given key k, the first thread 310 transitions 326 the first entry 311 from the insert transition state 220 to the valid state 230 for the given key k. If a second different thread attempts to insert the same key k after transition 321, it may select the first entry 311 as its candidate entry or it may select another entry. In the first case where it selects the first entry 311, the second thread may also pass through the scan barrier like the first thread 310. However, since transition 326 is accomplished by executing the atomic CAS instruction on the first entry 311, only one of the threads will successfully transition the first entry 311 from the insert transition state 220 to the valid state 230 for the given key k. The other unsuccessful thread may attempt the insert operation again starting with selection of a candidate entry in the target bucket 310. Alternatively, the other unsuccessful thread may complete the insert operation successfully as if it successfully transitioned the first entry 311 from the insert transition state 220 to the valid state 230 and then the other thread that actually successfully transitioned the entry immediately overwrote the value.

If, instead, the second thread selects an entry in the target bucket 310 other the first entry 311 as its candidate entry after transition 321, then the second thread may not pass through the scan barrier because it will discover more than one entry in the insert transition state 220 for the given key k during its performance of the scan barrier on the target bucket 310. In particular, in addition to its own candidate entry, it will discover the first entry 311 in the insert transition state 220 for the given key k as set by the first thread 301. As such, the second thread may transition its candidate entry back from the insert transition state 220 to the empty state 210 and attempt the insert operation again starting with selection of a candidate entry in the target bucket 310. In both cases, the second invariant and the linearizable interface guarantee are upheld in a lock-free manner.

The example of FIG. 3 illustrates how the scan barrier ensures that concurrent insert operations for the same key k on the shared hash map operate correctly. In particular, in the case where each of multiple concurrent threads select different candidate entries in the target bucket for inserting the same key k, because each of the threads performs the scan barrier on the target bucket, only one of the threads will not see any of the other threads' candidate entries when performing the scan barrier and only that one thread will pass through the scan barrier without having to retry the insert operation. Each of the other threads will see another's conflicting candidate entry when performing the scan barrier and each of these other threads will transition their candidate entry back to the empty state 210 and retry their insert operation.

Insert Process

Figure 4:
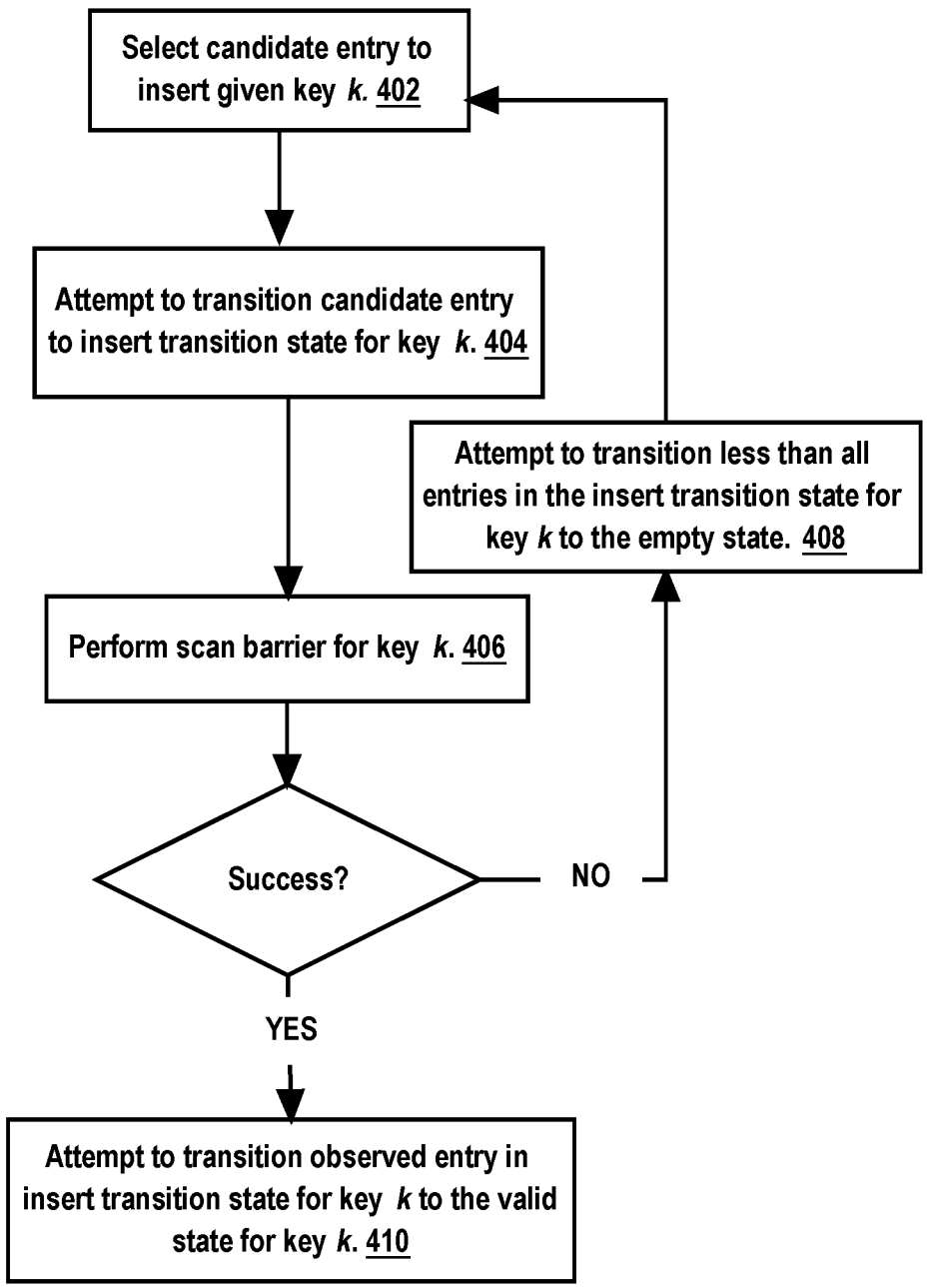
FIG. 4 is a flowchart of a process of inserting a specified key-value pair in the shared hash map in a lock-free manner, according to some embodiments.

With the foregoing lock-free model in mind, a process 400 for inserting a specified key-value pair into the shared hash map in a lock-free manner will now be described with reference to the flowchart 400 of FIG. 4. Process 400 may be performed by a "calling" thread to insert the specified key-value pair (k, v) into the shared hash map in a lock-free and linearizable manner. For example, the key-value pair may be specified by the calling thread as parameters to the PutIfNotExist( ) operation of the programmatic interface of the shared hash map described above.

After entering process 400, at operation 402, the calling thread selects a candidate entry for inserting the specified key-value pair (k, v). The selection may be made by atomically reading (e.g., using the atomic load instruction) each entry of the key k's bucket until a suitable candidate entry is identified. If no suitable candidate entry is identified, then the shared hash map is full with respect to the specified key k, the insert operation fails, and process 400 ends.

In some embodiments, a suitable candidate entry is, in order of preference: (1) an entry in the valid state 230 with the same key k, (2) an entry in the insert transition state 220 with the same key k, or (3) an entry in the empty state 210. The calling thread need not read each entry of the target bucket if it encounters the most preferred entry (i.e., an entry in the valid state 230 with the same key k) before reading all entries of the target bucket. This follows from the second invariant above where, for any given key k, there is at most one entry in the valid state 230 for the key k in the shared hash map.

In some embodiments, if process 400 is performed in an implementation of the PutIfNotExist( ) operation described above, then the process 400 may end after operation 402 with failure if the candidate entry is an entry in the valid state 230 with the same key k. This can happen because either: 1. the pair (k, v) to be inserted by the PutIfNotExist( ) operation is already stored in the shared hash map, or 2. a different value v' for the same key k is already stored in the shared hash map.

After selecting a candidate entry at operation 402, then, at operation 404, the calling thread attempts to atomically transition the candidate entry to the insert transition state 220 for the specified key k. This atomic transition may be accomplished by executing the atomic CAS instruction on the candidate entry specifying the current value of the candidate entry discovered at operation 402 as the expected value and the value (k, ⊥) as the target value for the candidate entry. If the current value of the candidate entry is changed by another thread since it was discovered at operation 402, then the atomic CAS instruction will fail and the calling thread can return to operation 402 to select a candidate entry again.

In some embodiments, operation 404 is skipped if the current value of the candidate entry observed at operation 402 is (k, ⊥). In other words, the state of the candidate entry observed at operation 402 was the insert transition state 220 for the given key k. In this case, the calling thread may proceed from operation 402 to operation 406, skipping operation 404, on the expectation that the candidate entry will likely still be in that state during performance of the scan barrier at operation 406.

In some embodiments, if the atomic CAS instruction at operation 404 fails because the current value of the candidate entry changed after operation 402, the calling thread may nevertheless proceed to operation 406 if the current value of the candidate entry witnessed by the atomic CAS instruction is (k, ⊥). In other words, the candidate entry was in the insert transition state 220 for the given key k when the atomic CAS instruction was executed on the candidate entry at operation 404.

At operation 406, the calling thread performs a scan barrier on the target bucket for the specified key k. This involves atomically reading each and every entry of the target bucket, one at a time, in probe order of the entries in the target bucket according to the hash function h, to determine whether there is only one entry in the insert transition state 220 for the given key k. For example, if hash function 150 is used, the index of the first entry of the target bucket in the array 120 may be identified by (k+0) mod E, the index of the second entry by (k+1) mod E, the index of the third entry of the target bucket by (k+2) mod E, and so on, up to the $B^{th}$ entry by (k+(B−1)) mod E where B is the bucket size of the target bucket.

If the scan barrier performed by the calling thread at operation 406 observed more than one entry in the insert transition state 220 for the given key k, then, at operation 408, the calling thread may attempt to atomically transition one of these conflicting entries from the insert transition state 220 to the empty state 210 by executing the atomic CAS instruction on the entry. The calling thread may then return to operation 402 to retry the insert operation.

In some embodiments, if more than one entry is observed in the insert transition state 220 for the given key k, then, at operation 408, the calling thread may attempt to atomically transition all but one of these conflicting entries from the insert transition state 220 to the empty state 210 by executing the atomic CAS instruction on all but one of these conflicting entries. By the causality illustrated in FIG. 3 provided by the scan barrier, if multiple concurrent threads are concurrently attempting to insert the same key k, at most one of the threads will a successfully pass through the scan barrier for the key k.

If, instead, the calling thread observed only one entry in the insert transition state 220 for the given key k when performing the scan barrier at operation 406, then, at operation 410, the calling thread may attempt to atomically transition the observed entry (which may be different than the candidate entry) from the insert transition state 220 to the valid state 230 for the given key k by executing the atomic CAS instruction on the observed entry. For this atomic CAS instruction, the expected value is (k, ⊥) and the target value is (k, v).

If the execution of the atomic CAS instruction at operation 410 successfully transitions the observed entry from the insert transition state 220 for the specified key k to the valid state 230 for the key k, then the current thread has successfully inserted the specified key-value pair into the shared hash map and process 400 ends.

On the other hand, if the execution of the atomic CAS instruction at operation 410 is unsuccessful, then it is because another thread also passed through its scan barrier for the given key k and successfully executed the atomic CAS instruction at operation 410 on the observed entry for the given key k. In this case, current value of the observed entry witnessed by the atomic CAS instruction executed at operation 410 by the current thread is either (k, v) or (k, v') where v' is not equal to v. In the case where (k, v) is witnessed, the current thread may treat such witness as if it successfully executed the atomic CAS instruction at operation 410. In the case where (k, v') is witnessed, the current thread may treat such witness as if it successfully executed the atomic CAS instruction at operation 410 and then the value (k, v) was immediately overwritten by the other thread with (k, v').

In some embodiments, implementations of the Put( ) operation and the CAS( ) operation of the programmatic interface of the shared hash map perform operation 402 of process 400 to identify a candidate entry.

In the case of a Put( ) operation, the Put( ) operation may return with success if the candidate entry is an entry in the valid state 230 with the same pair (k, v) to be inserted. This can happen because the pair (k, v) to be inserted is already stored in the shared hash map. On the other hand, if the candidate entry is an entry in the valid state 230 with the same key k but a different value v', then the Put( ) operation may attempt the atomic CAS instruction on the candidate entry to attempt to atomically transition it from (k, v') to (k, v). If that atomic CAS instruction is successful, then the Put( ) operation can return with success. If that atomic CAS instruction is unsuccessful, then the Put( ) operation can proceed depending on the witness of the atomic CAS instruction execution. If the witness is not an entry in the valid state 230 for the same key k, then the Put( ) operation can retry operation 402 to select a new candidate entry. On the other hand, if the witness is an entry in the valid state 230 for the same key k and the atomic CAS instruction was unsuccessful (i.e., the witness is (k, v") where v" does not equal v'), then the Put( ) operation can return success as if it successfully inserted (k, v) into the shared hash map and (k, v") was successfully inserted into the shared hash map immediately thereafter. If a candidate entry is an entry in insert transition state 220 for the given key k or the empty state 210, then the Put( ) operation may proceed with the remainder of process 400 as described above.

In the case of the CAS( ) operation, the CAS( ) operation may end with failure if the candidate entry selected by operation 402 is an entry in the insert transition state 220 with the same key k or an entry in the empty state 210. This is because there is no entry in the shared hash map that could match the expected value of the CAS( ) operation for the key k. In other words, there was no entry in the valid state 230 for the key k when operation 402 was performed. On the other hand, if the candidate entry is an entry in the valid state 230 for the given k, then the CAS( ) operation may attempt the atomic CAS instruction on the candidate entry to attempt to atomically transition it from (k, <expected value>) to (k, v). Here, the key k, the expected value <expected value>, and the value v are passed as parameters by the calling thread to the CAS( ) operation. The CAS( ) operation can return success or failure depending on the success or failure of that atomic CAS instruction on the candidate entry. If the case of failure of the atomic CAS instruction, the witness of the atomic CAS instruction can be returned to the calling thread as the witness to the CAS( ) operation.

Load Factor

As the number of entries in the shared hash map in the valid state 230 increases relative to the total number of entries in the shared hash map, the probability that an entry in the empty state 210 for a given key k decreases. As mentioned in the Background section, the known Robin-Hood technique allows hash maps to be performant at higher load factors. However, Robin-Hood hashing involves the hash map implementing an internal relocation step where an existing key-value pair is moved (relocated) from one entry to another within the hash map to lower the variance in probe distances.

Implementing the internal relocation step of Robin-Hood hashing in the shared hash map while upholding the linearizability guarantees and the second invariant described above is complicated because of the concurrent nature of the shared hash map. If the internal relocation is accomplished by temporarily storing the same key-value pair in more than one entry at the same time, then the second invariant is violated. If the existing key-value pair is first removed from the shared hash map and then stored in a new entry after removal, then the linearizability guarantees of the shared hash map would not be upheld in that case. For good performance of the shared hash map, especially with respect to concurrent insert and delete operations, it may be useful for the shared hash map to implement Robin-Hood hashing or other scheme that internally relocates entries within the hash map for the purpose of reducing the variance in open addressing probe distances.

According to some embodiments, to support Robin-Hood hashing or to otherwise support internally relocating a key-value pair within the shared hash map, the second invariant is modified slightly and an additional state and state transitions for entries in the shared hash map are supported.

The modified second invariant is as follows: for any given key k, if two entries exist in the shared hash map in the valid state 230 for the given key k, then the one of the two entries that exists at the "higher" entry index in the shared hash map according to the hash function h and accounting for the possibility that the key k's bucket can wrap-around (e.g., the end of the array 120) is always the destination entry for the relocation step. That is, the higher indexed entry is always the entry of the two that is being copied to and the lower indexed entry is always the entry of the two that is being copied from.

Figure 5:
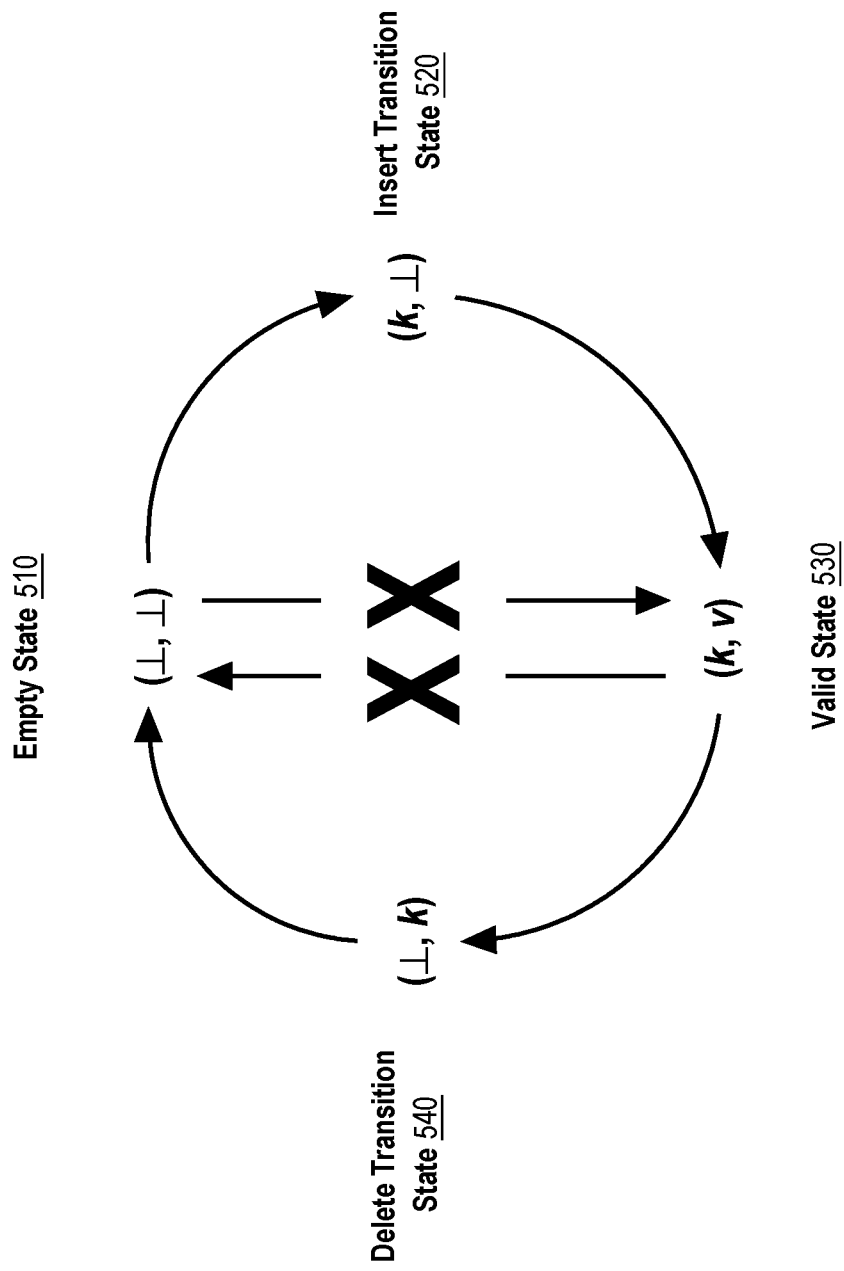
FIG. 5 shows valid states and state transitions for an entry in an array of entries for implementing a shared hash map in a lock-free manner such as that which is stored in the shared memory segment of FIG. 1, according to some embodiments.

FIG. 5 shows valid states and state transitions for an entry in the array of entries 120 for implementing the shared hash map in a lock-free manner while supporting relocation of valid entries within the shared hash map, according to some embodiments. As can been seen, the states include the states of the state diagram of FIG. 2 but with an additional delete transition state 540. In addition, an entry is no longer allowed to directly transition from the valid state 530 to the empty state 510 but instead must transition through the delete transition state 540.

In some embodiments, an entry in the delete transition state 540 for a given key k indicates to threads that the delete of the key k is in progress. In some embodiments, before a thread can transition any entry in the shared hash map in the delete transition state 540 for a given key k from the delete transition state 540 to the empty state 510, the thread must ensure that there are no entries in the shared hash map in the insert transition state 520 for the given key k and no entries in the shared hash map in the valid state 530 for the given key k. All such entries must first be transitioned to the delete transition state 540 for the given key k. Once all such entries are in the delete transition state 540 for the given key k and there are no entries in the shared hash map in the insert transition 520 for the given key k and no entries in the shared hash map in the valid state 530 for the given key k, only then can all entries in the delete transition state 540 for the given key k be transitioned to the empty state 510. This is necessary because an insert operation may race with a delete operation. As such, a thread performing an insert operation on the shared hash map for a given key k, if it observes an entry in the delete transition state 540 for the given key k (e.g., at operation 402 of process 400 above), must ensure the delete operation for the key k is complete before the thread proceeds with its own insert operation. This "inserting" thread can also participate in completing the delete operation in case the original thread performing the delete operation failed before it completed. For example, the thread performing the insert operation, before performing its own insert operation, upon observing at least one entry in the delete transition state 540 for the given key k, may transition any entries in the insert transition 520 for the given key k and any entries in the valid state 530 for the given key k to the delete transition state 540 for the given key k, and once this is done, may transition all entries in the delete transition state 540 for the given key k to the empty state 510, thereby completing the delete operation. It can then go on to perform its insert operation (e.g., according to process 400 above).

Relocation Process

Figure 6A:
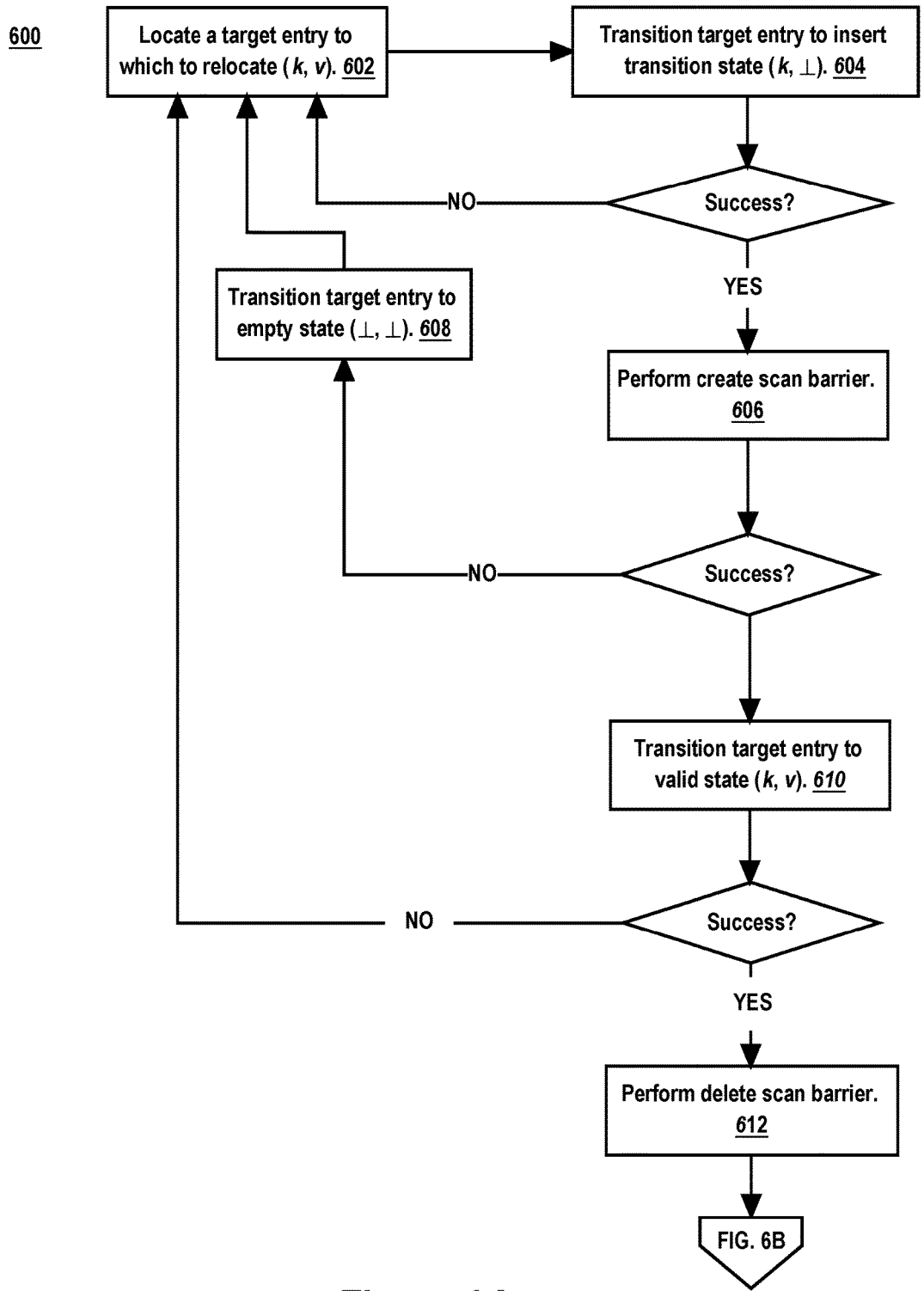
FIG. 6A and FIG. 6B is a flowchart of a process for relocating a key-value pair within the shared hash map in a lock-free manner, according to some embodiments.
Figure 6B:
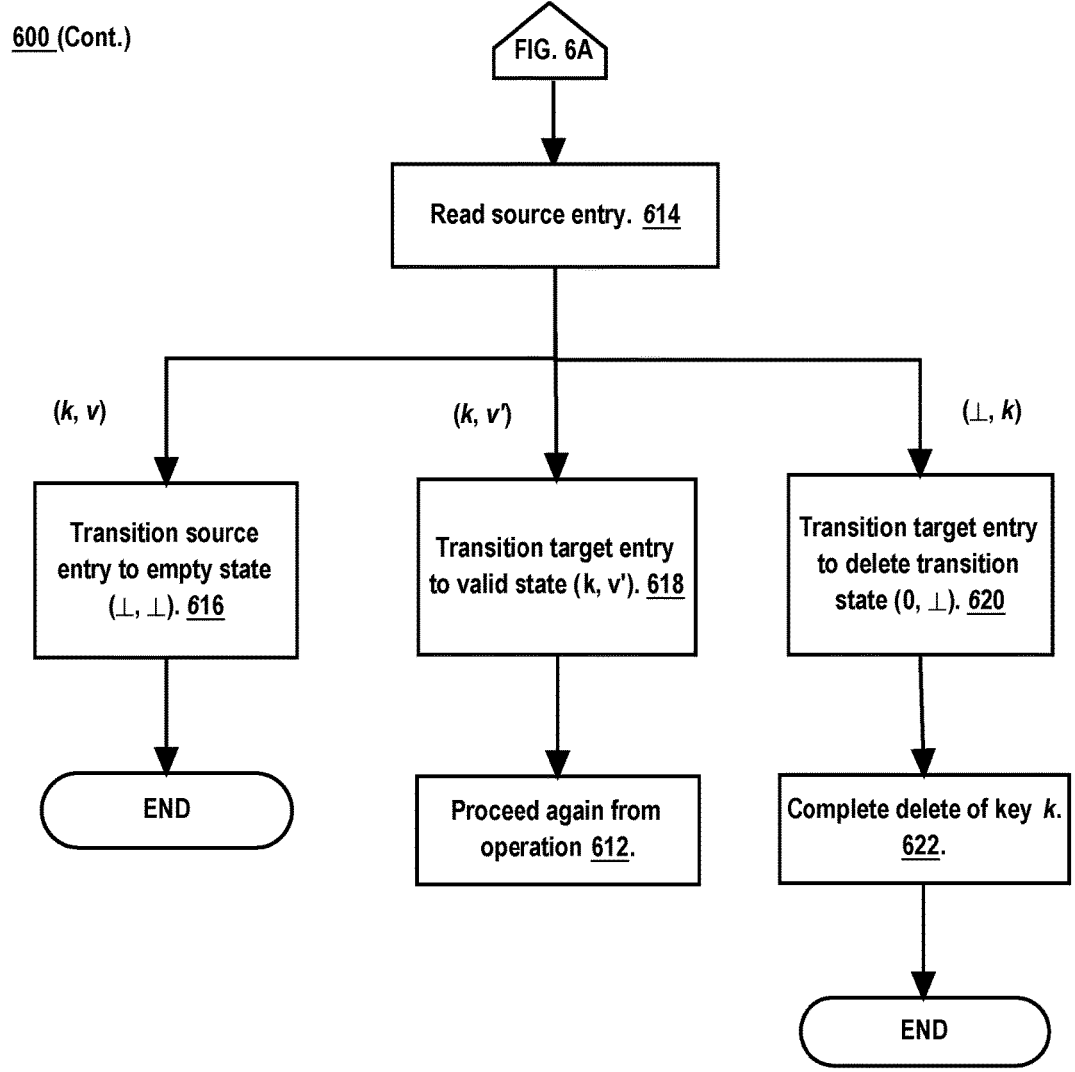

FIG. 6A and FIG. 6B is a flowchart of a process 600 for relocating a source entry for a given key k in the valid state 530 to a target entry in the shared hash map in a lock-free manner, according to some embodiments. For example, process 600 may be performed as part an implementation of the shared hash map that supports Robin-Hood hashing or other entry relocation scheme that aims to lower the variance in probe distances for hash map operations.

Process 600 proceeds from operation 602 where a calling thread attempts to identify a target entry to which to relocate the key-value pair (k, v) in the source entry. Both the source entry and the target entry will be located in the key k's bucket. Preferably, the target entry is an empty entry 510 that has a higher probe index within the key k's bucket than the source entry, accounting for the possibility that the bucket may wrap-around the end of the array 120. The probe index is determined by the particular hash function h in use for the shared hash map. If there are no entries in the empty state 510 in key k's bucket with a higher probe index than the source entry, then the relocation cannot be completed at the time and process 600 ends. The relocation process 600 may be retried after higher indexed entries are in the empty state 510 in key k's bucket.

At operation 604, the calling thread attempts to transition the target entry from (k, v) to the insert transition state 520 for the key k. This transition may be accomplished using the atomic CAS instruction. If the atomic CAS instruction is not successful, then the calling thread may return to operation 602 to try and find a new empty entry. On the other hand, if the atomic CAS instruction is successful, then process proceeds to operation 606.

At operation 606, the calling thread performs a "create" scan barrier on key k's bucket. For this, the calling thread atomically reads each entry of key k's bucket, one at a time, in probe order, to verify that all the following were observed by the calling thread when performing the create scan barrier on the bucket:

the only entry observed in the insert transition state 520 for key k is the target entry,
the only entry observed in the valid state 530 for key k is the source entry and the value observed in the source entry is still (k, v), and
there are no entries in the delete transition state 540 for key k.

If the scan barrier verification at operation 606 fails, then the calling thread may attempt to transition 608 the target entry from the insert transition state 520 to the empty state 510 using the atomic CAS instruction and then return to operation 602 regardless if the transition at operation 608 is successful or not. If the scan barrier verification at operation 606 failed because there were one or more entries in the delete transition state 540 for key k, then the calling thread may first attempt to complete the delete operation for key k before returning to operation 602.

If the scan barrier verification at operation 606 succeeds, then the process 600 proceeds to operation 610. At operation 610, the calling thread attempts to transition the target entry from the insert transition state 520 for key k to (k, v), thereby creating a copy of the source entry in the shared hash map. The transition 610 may be accomplished using the atomic CAS instruction. If the transition 610 is unsuccessful, then the calling thread may return to operation 602 to try again. If successful, then process proceeds to operation 612.

At operation 612, the calling thread performs a "delete" scan barrier on the key k's bucket. For this, the calling thread atomically reads each entry of key k's bucket, one at a time, in probe order.

Then, at operation 614, the calling thread atomically reads the source entry. The source entry can in different states when read at operation 614. The process 600 proceeds from operation 614 depending the state the source entry was in when read.

In a first state, the source entry is still (k, v). If the source entry read 614 is (k, v), then the calling thread atomically transitions 616 the source entry from (k, v) to the empty state 510, and the process 600 ends successfully.

In a second state, the source entry read 614 is (k, v') where v' does not equal v. In this case, the calling thread atomically transitions 618 the target entry from (k, v) to (k, v') and returns to operation 612 to retry process 600 starting from that operation (i.e., operation 612.)

In a third state, the source entry read 614 is in the delete transition state 540 for the key k. In this case, the calling thread atomically transitions 620 the target entry from (k, v) to the delete transition state 540 for the key k. The calling thread then at operation 622 performs a delete scan barrier like the one performed at operation 612 and then completes the delete operation of key k. Once the delete operation of key k is completed, process 600 ends without having relocated the source entry because the key k was deleted. Note this does not prevent the target entry from being changed by other threads while operations 620 and 622 are being performed, thereby providing lock-free operation in this regard.

Read Operations

In some embodiments, a lock-free read of a key k from the shared hash map involves simply atomically reading each entry of key k's bucket one by one, in probe order, until an entry is encountered that is in the valid state 230 or 530 for the given key k. The value v read from that entry can be returned to the calling thread (e.g., from the Get( ) operation).

Basic Computing Device

Figure 7:
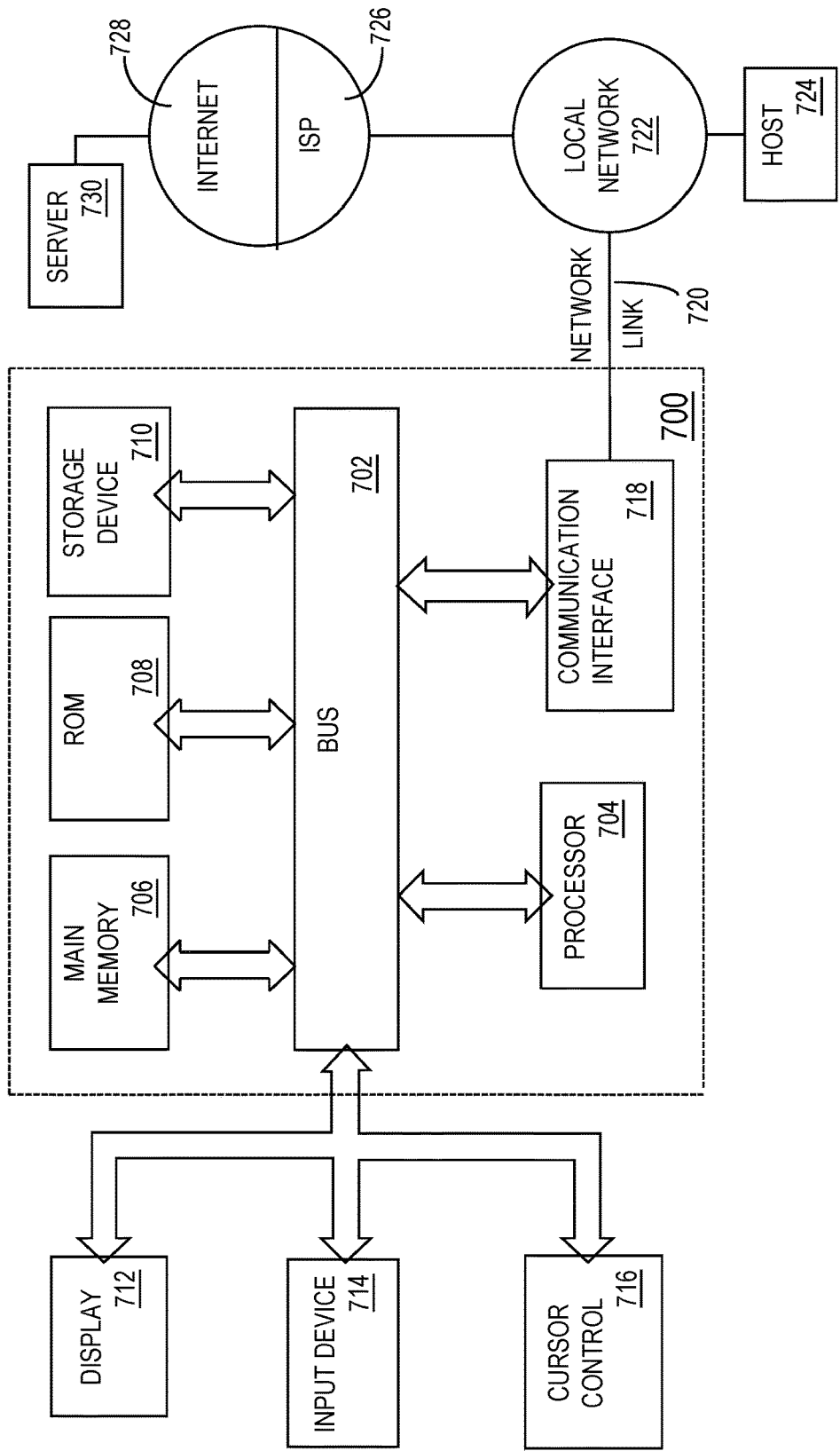
FIG. 7 depicts a basic computer system with which the shared hash map may be implemented, according to some embodiments.

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as an OLED, LED or cathode ray tube (CRT), for displaying information to a computer user. In some embodiments, the display 712 includes or is a virtual reality headset, such as a head-mounted display or an augmented reality display. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The input device may also have more than two degrees of freedom. For example, input device 714 may be a six degree-of-freedom input device that allows movement and rotations in each of three dimensions. The input device 714 may also have multiple input modalities, such as multiple 2-axes controllers, and/or input buttons or keyboard. This allows a user to input along more than two dimensions simultaneously and/or control the input of more than one type of action.

Computer system 700 may implement the techniques described herein using customized hard-wired logic, one or more ASICs or FPGAs, firmware and/or program logic which in combination with the computer system causes or programs computer system 700 to be a special-purpose machine. According to some embodiments, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Basic Software System

Figure 8:
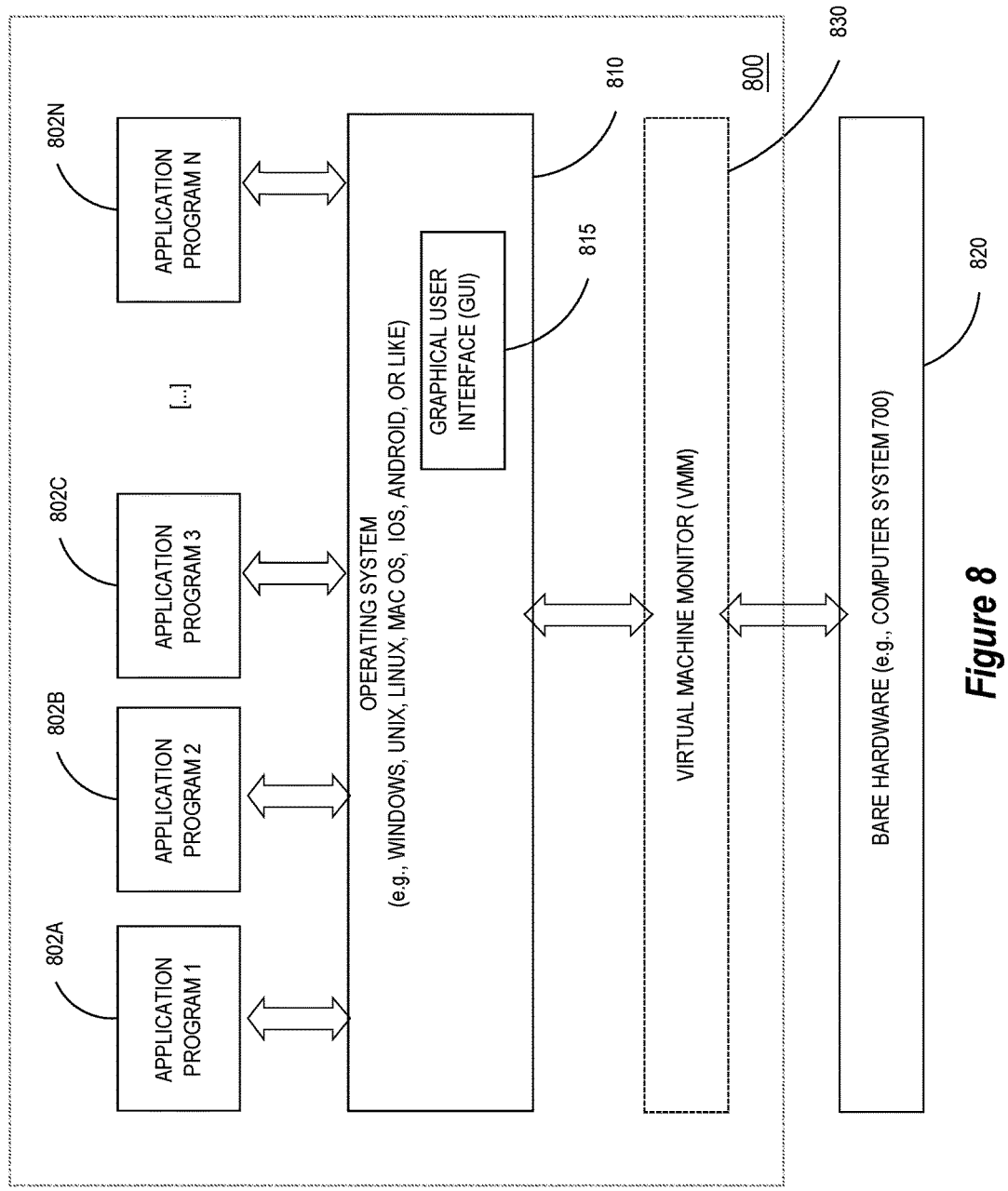
FIG. 8 depicts a basic software system that may be used to control the operation of the basic computer system of FIG. 7, according to some embodiments.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700. In this case, VMM 830 may manage low-level aspects of computer operation in addition to or instead of OS 810.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process or thread comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process or thread is not running. Computer system processes and threads run under the control of an operating system, and may run under the control of other programs being executed on the computer system.

The invention claimed is:

1. A method for inserting into a shared map in a lock free manner, the shared map stored in storage media of a computing device, the shared map accessible to a plurality of threads executing on the computing device, the shared map having a plurality of buckets defined by a hash function, each bucket of the plurality of buckets having a plurality of entries in the storage media, the method performed by a particular thread of the plurality of threads, the method comprising:
    selecting a candidate entry of a particular bucket into which to attempt to insert a particular key and a particular value, the particular key mapped to the particular bucket by the hash function;
    atomically transitioning the candidate entry selected to an insert transition state for the particular key; and
    then, after successfully performing an insert scan barrier for the particular key on the particular bucket, then atomically transitioning an observed entry of the particular bucket to a valid state for the particular key, where the observed entry in the valid state for the particular key comprises the particular key and the particular value.

2. The method of claim 1, wherein the selecting the candidate entry of the particular bucket is based on:
    atomically reading each entry of the particular bucket; and
    selecting, as the candidate entry, an entry of the particular bucket in an empty state.

3. The method of claim 1, wherein the selecting the candidate of the particular bucket is based on:
    atomically reading each entry of one or more entries of the particular bucket; and
    selecting, as the candidate entry, an entry of the one or more entries in a valid state for the particular key.

4. The method of claim 1, wherein the atomically transitioning the candidate entry selected to the insert transition state for the particular key is based on using an atomic compare and swap instruction supported by a hardware processor.

5. The method of claim 1, wherein the successfully performing the insert scan barrier for the particular key is based on:
    atomically reading each entry of the plurality of entries of the particular bucket; and
    selecting, as the observed entry, an entry of the particular bucket in the insert transition state for the particular key.

6. The method of claim 1, wherein the observed entry is not the candidate entry.

7. The method of claim 1, wherein the atomically transitioning the observed entry to the valid state for the particular key is based on using an atomic compare and swap instruction supported by a hardware processor.

8. The method of claim 1, further comprising:
    prior to the atomically transitioning the candidate entry selected to the insert transition state for the particular key:
    detecting a first entry of the particular bucket in a delete transition state for the particular key;
    detecting a second entry of the particular bucket in a valid state for the particular key; and
    only after atomically transitioning the second entry to the delete transition state for the particular key, then automatically transitioning the first entry to an empty state and atomically transitioning the second entry to the empty state.

9. The method of claim 1, further comprising:
    after the atomically transitioning the observed entry of the particular bucket to the valid state for the particular key:
    selecting a target entry of the particular bucket to which to relocate the particular key and the particular value of the observed entry;
    atomically transitioning the target entry to the insert transition state for the particular key;
    then, after successfully performing a create scan barrier on the particular bucket, then atomically transitioning the target entry of the particular bucket to the valid state for the particular key, where the target entry in the valid state for the particular key comprises the particular key and the particular value;
    then, after successfully performing a delete scan barrier on the particular bucket, then reading the observed entry; and
    then atomically transitioning the observed entry to an empty state.

10. A computer system comprising:
    one or more processors;
    storage media;
    a shared hash map stored in the storage media, the shared map accessible to a plurality of threads that execute on the computer system, the shared map having a plurality of buckets defined by a hash function, each bucket of the plurality of buckets having a plurality of entries in the storage media;
    one or more programs configured execution by the one or more processors, the one or more programs comprising instructions configured for:
    selecting a candidate entry of a particular bucket into which to attempt to insert a particular key and a particular value, the particular key mapped to the particular bucket by the hash function;

atomically transitioning the candidate entry selected to an insert transition state for the particular key; and then, after successfully performing an insert scan barrier for the particular key on the particular bucket, then atomically transitioning an observed entry of the particular bucket to a valid state for the particular key, where the observed entry in the valid state for the particular key comprises the particular key and the particular value.

11. The system of claim 10, wherein the selecting the candidate entry of the particular bucket is based on:
atomically reading each entry of the particular bucket; and
selecting, as the candidate entry, an entry of the particular bucket in an empty state.

12. The system of claim 10, wherein the selecting the candidate of the particular bucket is based on:
atomically reading each entry of one or more entries of the particular bucket; and
selecting, as the candidate entry, an entry of the one or more entries in a valid state for the particular key.

13. The system of claim 10, wherein the atomically transitioning the candidate entry selected to the insert transition state for the particular key is based on using an atomic compare and swap instruction supported by a hardware processor.

14. The system of claim 10, wherein the successfully performing the insert scan barrier for the particular key is based on:
atomically reading each entry of the plurality of entries of the particular bucket; and
selecting, as the observed entry, an entry of the particular bucket in the insert transition state for the particular key.

15. The system of claim 10, wherein the atomically transitioning the observed entry to the valid state for the particular key is based on using an atomic compare and swap instruction supported by a hardware processor.

16. The system of claim 10, the instructions further configured for:
prior to the atomically transitioning the candidate entry selected to the insert transition state for the particular key:
detecting a first entry of the particular bucket in a delete transition state for the particular key;
detecting a second entry of the particular bucket in a valid state for the particular key; and
only after atomically transitioning the second entry to the delete transition state for the particular key, then automatically transitioning the first entry to an empty state and atomically transitioning the second entry to the empty state.

17. The system of claim 10, the instructions further configured for:
after the atomically transitioning the observed entry of the particular bucket to the valid state for the particular key:
selecting a target entry of the particular bucket to which to relocate the particular key and the particular value of the observed entry;
atomically transitioning the target entry to the insert transition state for the particular key;
then, after successfully performing a create scan barrier on the particular bucket, then atomically transitioning the target entry of the particular bucket to the valid state for the particular key, where the target entry in the valid state for the particular key comprises the particular key and the particular value;

then, after successfully performing a delete scan barrier on the particular bucket, then reading the observed entry; and
then atomically transitioning the observed entry to an empty state.

18. The system of claim 10, wherein each entry of the plurality of entries of the particular bucket has a same fixed bit-width.

19. The system of claim 18, wherein the same fixed bit-width is one hundred and twenty-eight (128) bits; and wherein sixty-four (64) of the one hundred and twenty-eight (128) bits is designated for storing a key.

20. One or more non-transitory computer-readable media storing one or more programs for inserting into a shared map in a lock free manner, the shared map stored in storage media of a computing device, the shared map accessible to a plurality of threads executing on the computing device, the shared map having a plurality of buckets defined by a hash function, each bucket of the plurality of buckets having a plurality of entries in the storage media, the one or more programs including instructions which, when executed in a particular thread of the plurality of threads at the computing device, cause the computing device to perform operations comprising:
selecting a candidate entry of a particular bucket into which to attempt to insert a particular key and a particular value, the particular key mapped to the particular bucket by the hash function;
atomically transitioning the candidate entry selected to an insert transition state for the particular key; and
then, after successfully performing an insert scan barrier for the particular key on the particular bucket, then atomically transitioning an observed entry of the particular bucket to a valid state for the particular key, where the observed entry in the valid state for the particular key comprises the particular key and the particular value.

21. The one or more non-transitory computer-readable media of claim 20, wherein the selecting the candidate entry of the particular bucket is based on:
atomically reading each entry of the particular bucket; and
selecting, as the candidate entry, an entry of the particular bucket in an empty state.

22. The one or more non-transitory computer-readable media of claim 20, wherein the selecting the candidate of the particular bucket is based on:
atomically reading each entry of one or more entries of the particular bucket; and
selecting, as the candidate entry, an entry of the one or more entries in a valid state for the particular key.

23. The one or more non-transitory computer-readable media of claim 20, wherein the atomically transitioning the candidate entry selected to the insert transition state for the particular key is based on using an atomic compare and swap instruction supported by a hardware processor.

24. The one or more non-transitory computer-readable media of claim 20, wherein the successfully performing the insert scan barrier for the particular key is based on:
atomically reading each entry of the plurality of entries of the particular bucket; and
selecting, as the observed entry, an entry of the particular bucket in the insert transition state for the particular key.

25. The one or more non-transitory computer-readable media of claim 20, wherein the observed entry is not the candidate entry.

26. The one or more non-transitory computer-readable media of claim 20, wherein the atomically transitioning the observed entry to the valid state for the particular key is based on using an atomic compare and swap instruction supported by a hardware processor.

27. The one or more non-transitory computer-readable media of claim 20, the operations further comprising:
prior to the atomically transitioning the candidate entry selected to the insert transition state for the particular key:
detecting a first entry of the particular bucket in a delete transition state for the particular key;
detecting a second entry of the particular bucket in a valid state for the particular key; and
only after atomically transitioning the second entry to the delete transition state for the particular key, then automatically transitioning the first entry to an empty state and atomically transitioning the second entry to the empty state.

28. The one or more non-transitory computer-readable media of claim 20, the operations further comprising:
after the atomically transitioning the observed entry of the particular bucket to the valid state for the particular key:
selecting a target entry of the particular bucket to which to relocate the particular key and the particular value of the observed entry;
atomically transitioning the target entry to the insert transition state for the particular key;
then, after successfully performing a create scan barrier on the particular bucket, then atomically transitioning the target entry of the particular bucket to the valid state for the particular key, where the target entry in the valid state for the particular key comprises the particular key and the particular value;
then, after successfully performing a delete scan barrier on the particular bucket, then reading the observed entry; and
then atomically transitioning the observed entry to an empty state.

* * * * *